(12) United States Patent
Ferron et al.

(10) Patent No.: US 8,212,193 B2
(45) Date of Patent: Jul. 3, 2012

(54) ALUMINIUM COOKING VESSEL FOR USE ON INDUCTION PLANES

(75) Inventors: Francesco Ferron, Casalmaggiore (IT); Jacopo Ferron, Casalmaggiore (IT)

(73) Assignee: Ballarini Paolo & Figli S.p.A., Rivarolo Mantovano (IT)

( * ) Notice: Subject to any disclaimer, the term of this patent is extended or adjusted under 35 U.S.C. 154(b) by 392 days.

(21) Appl. No.: 12/704,067

(22) Filed: Feb. 11, 2010

(65) Prior Publication Data

US 2010/0206870 A1 Aug. 19, 2010

(30) Foreign Application Priority Data

Feb. 13, 2009 (IT) .................................. MI09A0195

(51) Int. Cl.
*H05B 6/12* (2006.01)
(52) U.S. Cl. ...................... 219/621; 219/438; 220/573.1
(58) Field of Classification Search .................. 219/438, 219/439, 620, 621, 622; 220/573.1, 912; 228/5.1, 16, 56.1; D7/354, 402; 99/324; 72/47
See application file for complete search history.

(56) References Cited

U.S. PATENT DOCUMENTS

| | | | | |
|---|---|---|---|---|
| 457,561 A * | 8/1891 | Kennedy | ...................... | 219/628 |
| 505,364 A * | 9/1893 | MacIntosh | .................. | 220/4.03 |
| 932,242 A * | 8/1909 | Berry | ............................ | 219/620 |
| 2,932,293 A * | 4/1960 | Rassieur | ....................... | 126/369 |
| 3,928,744 A * | 12/1975 | Hibino et al. | ................. | 219/624 |
| D341,990 S * | 12/1993 | Yim | ................... | D7/354 |
| D392,152 S * | 3/1998 | Rae | ................ | D7/402 |
| D392,840 S * | 3/1998 | Rae | ................ | D7/402 |
| 5,855,160 A * | 1/1999 | Shen | .................. | 99/279 |
| D414,375 S * | 9/1999 | Diulius | ........................ | D7/354 |
| D542,591 S * | 5/2007 | Carlson | ........................ | D7/354 |
| D587,062 S * | 2/2009 | Ek | ................... | D7/354 |
| D618,491 S * | 6/2010 | Welk et al. | .................. | D7/360 |
| D627,193 S * | 11/2010 | Marin | ......................... | D7/402 |
| D637,861 S * | 5/2011 | Degnan | ....................... | D7/360 |
| 2010/0000980 A1 * | 1/2010 | Popescu | ....................... | 219/201 |
| 2011/0253706 A1 * | 10/2011 | Wang et al. | .................... | 219/624 |

* cited by examiner

*Primary Examiner* — N Drew Richards
*Assistant Examiner* — Grant Withers
(74) *Attorney, Agent, or Firm* — Kirschstein, et al.

(57) ABSTRACT

An aluminium cooking vessel comprises a vessel bottom coupled to a steel plate for providing an electric induction plane heating, the steel plate including a plurality of plate holes and being subjected, about each plate hole to a force applied with an annular pattern to deform the steel plate about each hole with a Z deforming arrangement, the vessel material, displaced as the steel plate is deformed assuming a mushroom arrangement to cover the perimeter of the plate holes.

14 Claims, 6 Drawing Sheets

ALUMINIUM COOKING VESSEL FOR USE ON INDUCTION PLANES

BACKGROUND OF THE INVENTION

The present invention relates to an aluminium cooking vessel for use on electric induction planes.

As is known, aluminium cooking vessels cannot be generally used on induction planes which, on the other hand, are encountering an increasing diffusion.

Thus, for allowing aluminium vessels to be used on electric induction planes, the vessel aluminium body is coupled, as is known, to a ferritic steel disc element, made for example of an AISI 430 or AISI 439 steel material.

Other systems for applying a ferritic steel disc on the bottom of an aluminium vessel, to make said aluminium vessel responsive to the magnetic field induced by magnetic induction cooking planes, are also known and provide, for example, to solder to the vessel a steel disc element, by using steel containing soldering paste materials having a melting temperature of about 500° C.

The above melting method, however, is rather complex from a technological standpoint.

Another method for coupling an aluminium vessel to a steel disc is the so-called "impact bonding" method providing to assemble by friction said vessel and disc by a high power fly press.

All the above methods, however, are technically complex and expensive.

Yet another recent assembling method provides to arrange a steel disc element on the bottom of the aluminium vessel, the steel disc element including a plurality of assembling holes for assembling it to the aluminium vessel body. In this latter assembling method, the steel disc is pressed by a very high pressing power (larger than 1,000 tons), to cause the aluminium material to cover and fill-in said throughgoing disc holes, at hole regions where said aluminium material does not encounter any resistance to its flow.

However, to provide, by this latter method, a comparatively safe assembling, the steel disc element must be provided with a plurality holes tapering toward the bottom of the aluminum vessel body and, as very high forces are applied thereto, a portion of the aluminium material of the vessel bottom is so displaced as to partially fill said holes, to prevent the ferritic steel disc element from disengaging from the aluminium vessel.

The provision through the steel disc element of said tapering holes to lock the disc, requires a use of complex shearing or cutting systems and steel discs having a thickness larger than about 0.7 mm, with a correspondingly large overall area of the drilled portion so as to affect about 25% of the steel disc surface.

Yet another method for assembling the aluminium body of a cooking vessel to a steel disc provides to perform riveting operations to form within each steel disc hole a corresponding nail shape head portion allowing the steel disc to be safely locked.

In this connection it should be pointed out that, because of different thermal dilatations occurring between the steel disc and aluminium body, the aluminium body and steel disc assembly is subjected to very high deforming forces tending to disengage the steel disc from the aluminium body, if it is not sufficiently clamped thereto.

Moreover, it should be also pointed out that a ferritic steel disc having, for example, a diameter of 200 mm would have a disc area of 314,000 mm$^2$. Thus, for allowing the aluminium material to exit the disc holes in the assembling step, it would be necessary to apply a very high force on the overall surface of the disc, thereby, to achieve a proper yielding on the vessel bottom, it would be necessary to apply a pressing force of about 4,000 t.

As it should be apparent to one skilled in the art, the above high powers cannot be generally easily achieved and, accordingly, the displaced aluminium material will not sufficiently fill the disc holes, thereby the latter will not be perfectly clamped or locked, and, under different thermal dilatations occurring in cooking operations, said steel disc could detach from the vessel body.

SUMMARY OF THE INVENTION

Accordingly, the aim of the invention is to overcome the above mentioned drawbacks of the prior art by coupling the bottom of an aluminium vessel to a steel disc including a small number of throughgoing holes, with a very small drawing force.

The above object is achieved by an aluminium cooking vessel, having a vessel bottom coupled to a ferritic steel plate, for providing an induction plane heating, said plate including a plurality of plate holes, said steel plate being subjected, about each said plate hole, to a force (F) operating on an annular section to deform said steel plate about each said hole with a Z deforming arrangement, the aluminium material of said vessel bottom, displaced as said steel plate is deformed, assuming a mushroom arrangement to cover the perimeter of the holes of said plate.

Advantageously, said plate will assume, after deformation, at said holes, inclined surface annular edges, said holes having an overall surface which is less than 12% of the overall surface of said plate, and the centers of adjoining said holes are spaced from one another by a distance larger than or equal to 12 mm.

Moreover, the thickness of said plate is advantageously less than 0.5 mm.

Thus, advantageously, the aluminium cooking vessel has the above defined features.

BRIEF DESCRIPTION OF THE DRAWINGS

The subject matter according to the present invention will be disclosed and illustrated in a more detailed manner hereinafter, by means of a preferred embodiment thereof, given only by way of an example and with reference to the accompanying drawings, where.

DESCRIPTION OF THE PREFERRED EMBODIMENTS

Figure 1:
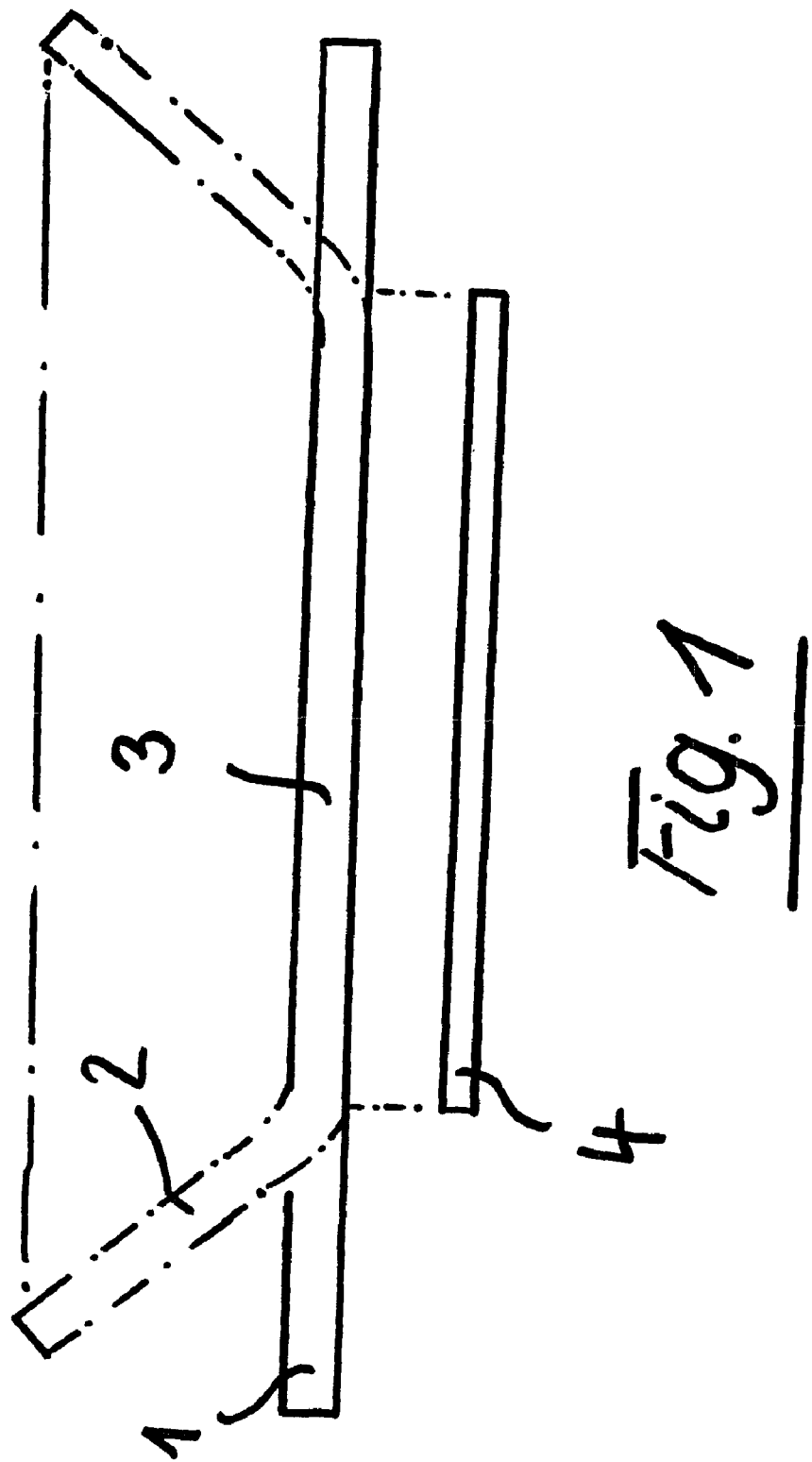
FIG. 1 is a view of an aluminium plate to be deformed to provide a cooking vessel, and a steel plate to be applied on the bottom of the vessel.

As is shown in FIG. 1, an aluminium plate 1 is deformed in a deforming die or mold for making a kitchen or cooking vessel 2 including a vessel bottom 3.

To allow the aluminium vessel to be also used on electric induction cooking planes or surfaces, the bottom 3 of the vessel 2 must comprise a steel plate or disc 4, advantageously made of a ferritic steel material, thereby said aluminium vessel 2 may also advantageously be heated by electric induction, just owing to the provision of said plate 4.

Figure 2:
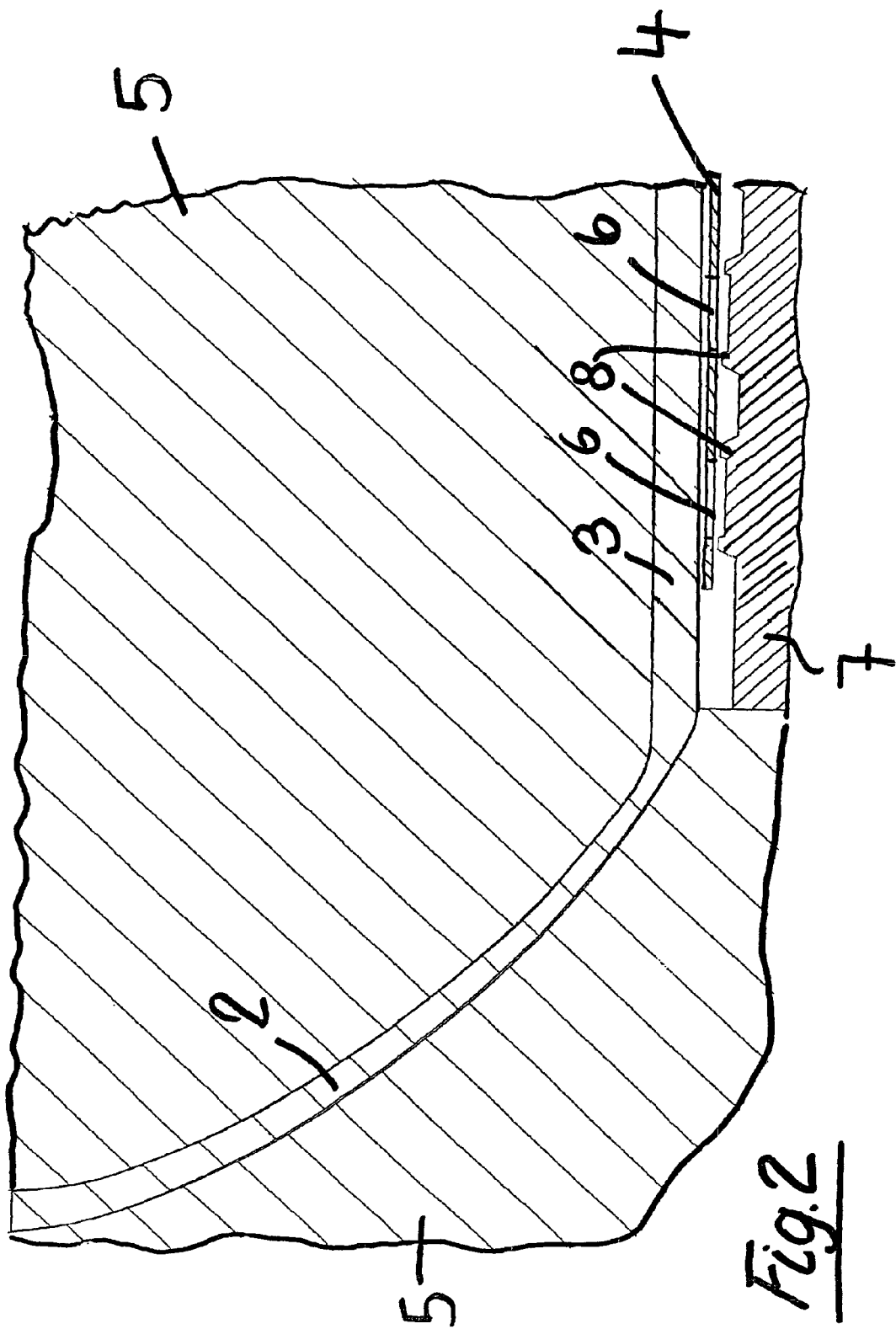
FIG. 2 is a schematic cross-sectional view showing a deforming die for deforming the vessel and a further die for applying a steel plate.

FIG. 2 shows the deforming die designed for providing the vessel 2 with its desired end configuration, in particular, by forming, during the deforming step, the vessel bottom and upright walls.

The bottom 3 must be fitted with said ferritic steel plate 4 to allow it to be perfectly heated by electric induction. As shown, said plate 4 comprises a plurality of throughgoing holes 6 distributed therethrough and, at the bottom thereof, the deforming die 5 comprises an auxiliary die 7, which, at said holes, comprises corresponding annular projections 8, designed for deforming the corresponding region of the plate 4 to the material forming the bottom 3 of the aluminium vessel 2. At the end of the vessel 2 deforming operation, the vessel bottom 3 will be firmly coupled to the steel plate 4.

Figure 3:
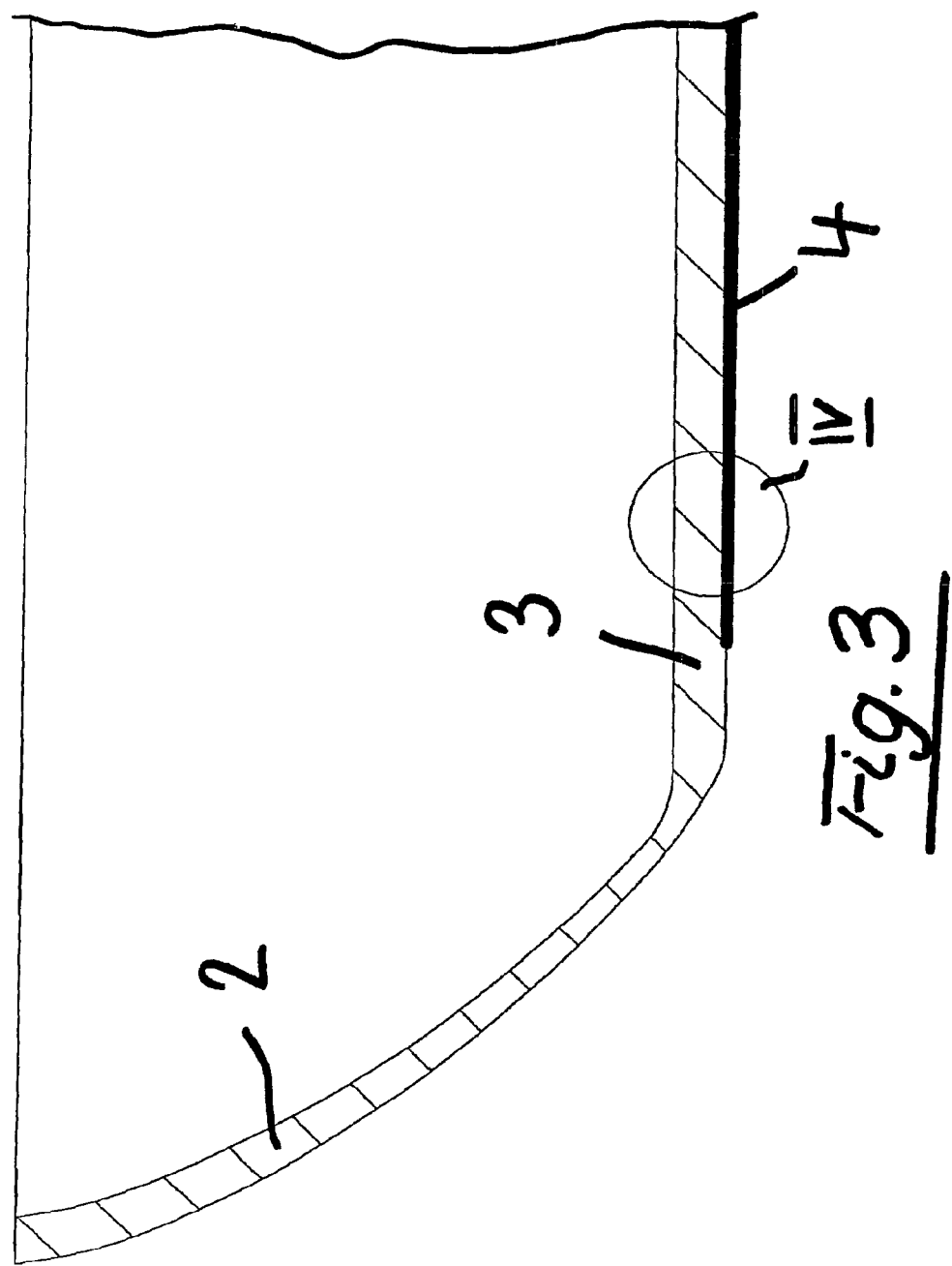
FIG. 3 is another cross-sectional view showing a kitchen vessel with the steel plate applied thereto.
Figure 4:
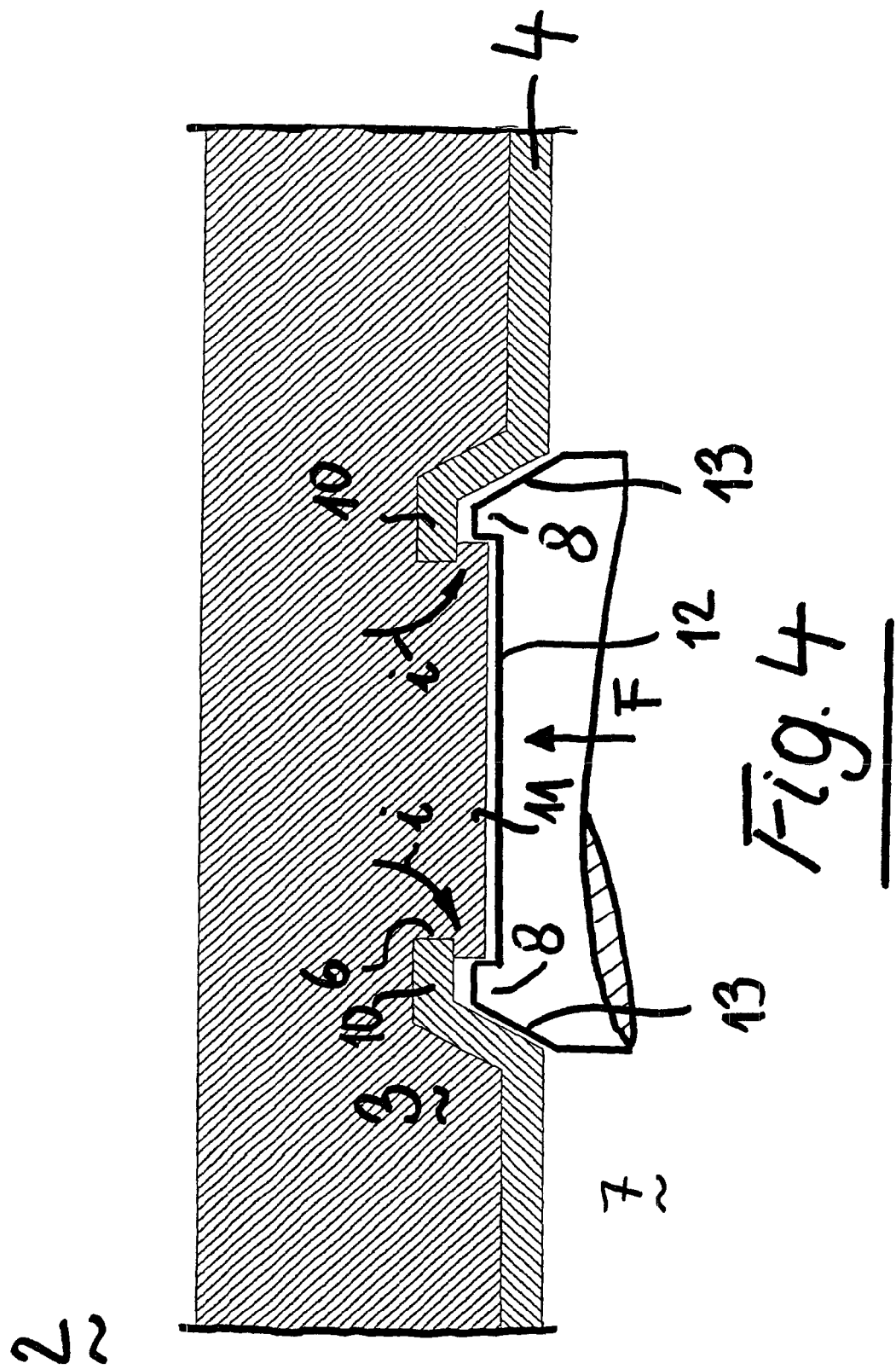
FIG. 4 shows a detail of a bottom of a vessel with the steel plate applied thereto by an applying tool shown in detail.

For performing this assembling or coupling, as is shown in FIG. 4 illustrating a detail IV of FIG. 3, about each hole 6 of said steel plate 4 a plurality of projections 8 are arranged in a ring-like arrangement.

Thus, by applying to the projections 8 a force F, that region of the steel plate 4 encompassing the plate holes 6 will be pressed against the material of the bottom 3, thereby deforming said plate in this region 10, with a Z deforming arrangement or pattern.

This deformed region 10 of the plate 4 will cause a bottom 3 material displacement, as indicated by the arrows (i) in FIG. 4, and the displaced material will be arranged above the end portion or region 10 of the plate, encompassing each said hole 6 thereof.

Such a displacement of the bottom 3 material will lock the end portion 10 of the steel plate by a mushroom deformed region 11.

To provide the mushroom region 11 with an aesthetically pleasant and clean aspect, between the deforming projection 8 a flat surface 12 is included and, on their outer side, said ring-like arranged projections 8 have a slanted surface 13.

While FIG. 4 shows only a single deforming region, it should be apparent that, depending on requirements, the deforming tool 7 could comprise ring-like projections 8 as required.

Figure 5:
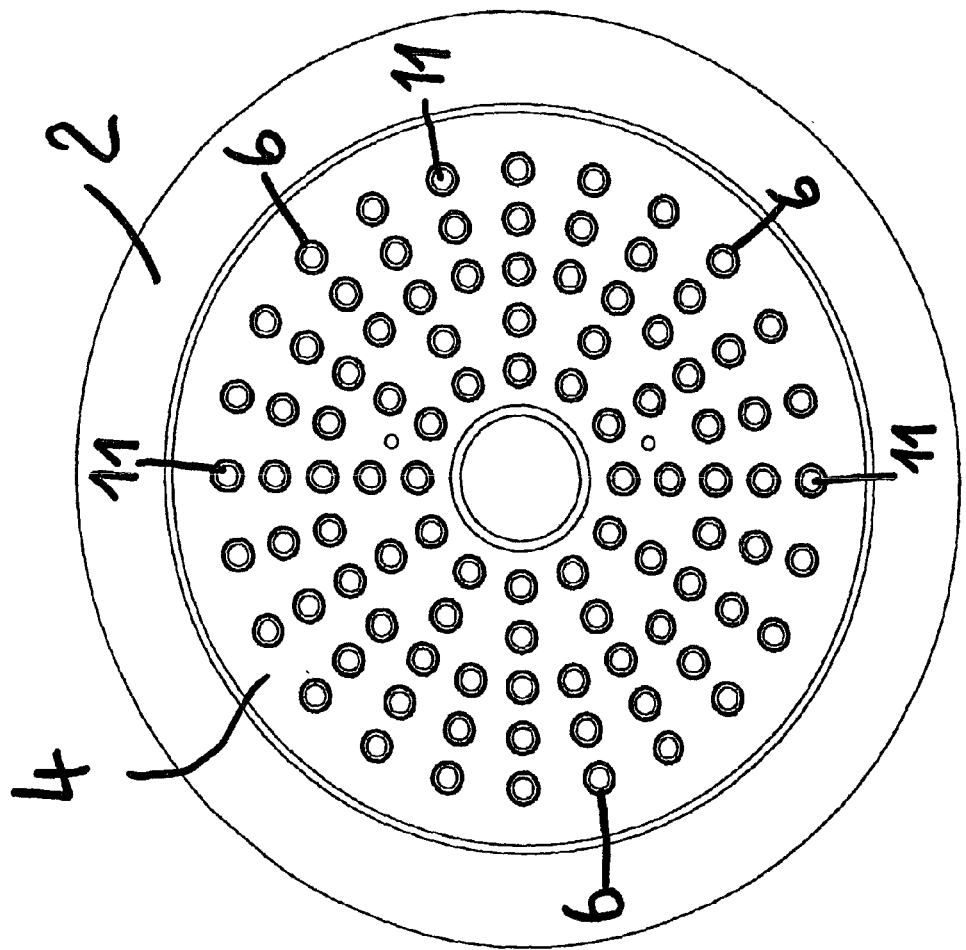
FIG. 5 shows the vessel bottom.

FIG. 5 shows the bottom 4 of the vessel 2.

In particular, the bottom 4, made of a steel material, comprises a plurality of throughgoing holes or openings 6 which are advantageously arranged in radial rows (FIGS. 5 and 6), the plate 4 being locked in said openings 6 by mushroom deformed portions 11.

Figure 6:
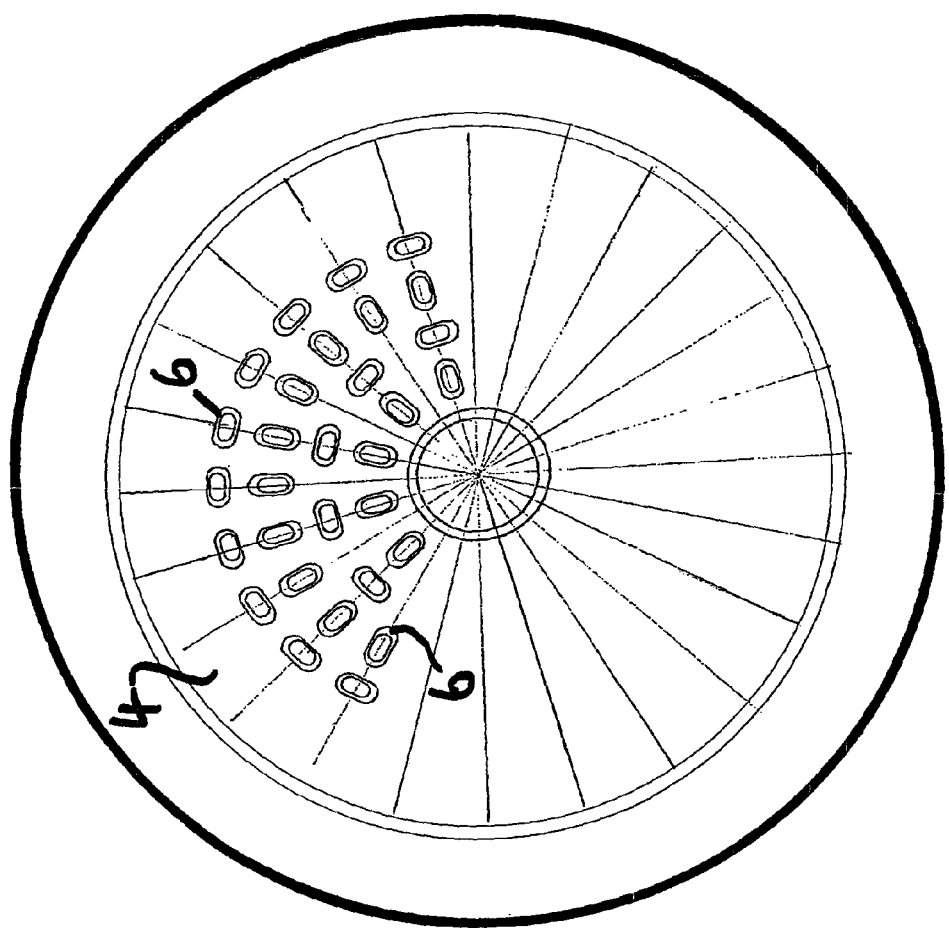
FIG. 6 shows a further embodiment of the bottom of a cooking vessel.

While in FIG. 5 the openings 6 have a circular shape, FIG. 6 shows that said openings 6 could also have an oval shape.

Thus, owing to the provision of a deforming tool 7 applying its deforming force only and exclusively about the holes 6 of the plate 4, but not on the overall plate 4 to be coupled to the bottom 3 of the vessel 2, said force will have a very small value, and moreover, owing to the highly efficient coupling of the invention, it is also possible to use a small number of plate holes, thereby consequently reducing the necessary drilling power requirement.

In actual practice, the invention provides an optimum clamping with a drilled surface corresponding to only 9%-12% of the plate overall surface.

For example, with the above plate 4 having a diameter of 200 mm, it is possible to provide few holes providing a hole overall surface of about 3,000 mm².

The overall surface of the hole edges thereon said force (F) operates will be less than 6,000 mm².

Accordingly, the force (F) required for yielding the steel/aluminium assembly will be less than 500 tons (that is by 8±10 time less than that used in the prior art).

The invention claimed is:

1. An induction cooking vessel, comprising:
   a vessel body having a vessel bottom wall constituted of a deformable, non-ferrous material, and side walls extending upwardly from the vessel bottom wall; and
   a plate constituted of a deformable, ferrous material, the plate having a generally planar plate body and a plurality of holes extending through the plate,
   wherein the plate has deformed, generally conical, plate portions surrounding each hole and extending into the deformed vessel bottom wall,
   wherein the plate has deformed, generally planar, end portions extending into the deformed vessel bottom wall and lying generally parallel to the generally planar plate body, and
   wherein the vessel bottom wall has deformed bottom wall portions extending through each hole past and underneath the deformed, generally planar, end portions to couple the plate to the vessel bottom wall.

2. The induction cooking vessel of claim 1, wherein the non-ferrous material of the vessel body is aluminum, and wherein the ferrous material of the plate is steel.

3. The induction cooking vessel of claim 1, wherein each deformed, generally conical, plate portion converges in a direction away from the generally planar plate body to a respective deformed, generally planar, end portion.

4. The induction cooking vessel of claim 1, wherein each deformed bottom wall portion has a generally planar, outer surface.

5. The induction cooking vessel of claim 1, wherein each deformed, generally planar, end portion is captured and embedded in a respective deformed bottom wall portion.

6. The induction cooking vessel of claim 1, wherein the plate and the vessel bottom wall have circular shapes.

7. The induction cooking vessel of claim 1, wherein the plate is symmetrical about a central axis, and wherein the holes are spaced apart and arranged along rows extending radially of the axis.

8. The induction cooking vessel of claim 7, wherein a number of the holes along one of the rows is different from a number of the holes along another of the rows.

9. The induction cooking vessel of claim 7, wherein the holes have centers that are spaced apart by a radial distance of at least twelve millimeters.

10. The induction cooking vessel of claim 1, wherein the plate has an overall surface area, and wherein the holes occupy an area that is less than twelve percent of the overall surface area.

11. The induction cooking vessel of claim 1, wherein each hole has a circular shape.

12. The induction cooking vessel of claim 1, wherein each hole has an oval shape.

13. The induction cooking vessel of claim 1, wherein the plate is a disc having a thickness that is less than one-half a millimeter.

14. A method of making an induction cooking vessel, comprising the steps of:
   forming a vessel body with a vessel bottom wall of a deformable, non-ferrous material and side walls extending upwardly from the vessel bottom wall;
   forming a plate of a deformable, ferrous material with a generally planar plate body, a plurality of holes extending through the plate, and plate portions surrounding each hole;
   deforming each plate portion to have a deformed, generally conical inclined wall that extends into the vessel bottom wall, and to terminate in a deformed, generally planar, end portion that extends into the vessel bottom wall and lays generally parallel to the generally planar plate body; and
   deforming the vessel bottom wall to have deformed bottom wall portions extending through each hole past and underneath each deformed, generally planar, end portion to couple the plate to the vessel bottom wall.

* * * * *